(12) United States Patent
Hattori et al.

(10) Patent No.: US 8,860,667 B2
(45) Date of Patent: Oct. 14, 2014

(54) DISPLAY TERMINAL DEVICE

(75) Inventors: Yasuyuki Hattori, Tokyo (JP); Takuji Maekawa, Kanagawa (JP); Masaki Takemura, Tokyo (JP)

(73) Assignee: Sony Corporation, Tokyo (JP)

( * ) Notice: Subject to any disclaimer, the term of this patent is extended or adjusted under 35 U.S.C. 154(b) by 1148 days.

(21) Appl. No.: 11/993,554

(22) PCT Filed: Jun. 12, 2006

(86) PCT No.: PCT/JP2006/311780
§ 371 (c)(1),
(2), (4) Date: Jan. 23, 2009

(87) PCT Pub. No.: WO2006/137286
PCT Pub. Date: Dec. 28, 2006

(65) Prior Publication Data
US 2010/0149196 A1 Jun. 17, 2010

(30) Foreign Application Priority Data

Jun. 23, 2005 (JP) .............................. P2005-183955

(51) Int. Cl.
*G09G 5/00* (2006.01)
*G06F 3/041* (2006.01)
(Continued)

(52) U.S. Cl.
CPC *G07F 17/32* (2013.01); *G09F 9/35* (2013.01); *G06F 3/147* (2013.01); *G09G 2380/06* (2013.01); *G09F 27/00* (2013.01); *G06Q 30/02* (2013.01); *G06F 3/0482* (2013.01); *G07F 17/3227* (2013.01)
USPC ........................... 345/173; 345/169; 345/520

(58) Field of Classification Search
CPC .............. G06F 3/0488; G06F 3/04886; G06F 3/04883; G06F 3/04865; G06F 3/04875; G06F 3/04887
USPC .......................... 345/156, 169, 173–179, 520
See application file for complete search history.

(56) References Cited

U.S. PATENT DOCUMENTS 5,745,049 A * 4/1998 Akiyama et al. .......... 340/870.17
6,868,451 B1 * 3/2005 Peacock ........................ 709/231
(Continued)

FOREIGN PATENT DOCUMENTS

JP 11-353432 A 12/1999
JP 2000 250984 9/2000
(Continued)

OTHER PUBLICATIONS

U.S. Appl. No. 09/655,667, filed Sep. 20, 2000, Kitada.
(Continued)

*Primary Examiner* — Hau Nguyen
(74) *Attorney, Agent, or Firm* — Oblon, Spivak, McClelland, Maier & Neustadt, L.L.P.

(57) ABSTRACT

Disclosed is a display terminal device including a display operating unit (12), a first communication unit (22), a reader/writer circuit (24) and a controller (26). The display operating unit is provided on a main body unit (11) to display advertisement data, and the first communication unit communicates with a host device. The reader/writer circuit is provided on the main body unit (11) and communicated with the memory from the display operating unit (12) side to write and/or read out data relevant to the advertisement data. The controller allows advertisement data received by the first communication unit (22) to be displayed on a display operating unit (12). The controller causes data written and/or read out by the reader/writer circuit (24) to be transmitted to or received from a host device or another device via the first communication unit (22). Since the display operating unit (12) side may communicate with a memory, such as an IC card, the data relevant to the advertisement data may be exchanged extremely readily.

4 Claims, 11 Drawing Sheets

(51) Int. Cl.
  *G06F 13/14* (2006.01)
  *G09F 9/35* (2006.01)
  *G06F 3/147* (2006.01)
  *G09F 27/00* (2006.01)
  *G07F 17/32* (2006.01)
  *G06Q 30/02* (2012.01)
  *G06F 3/0482* (2013.01)

(56) References Cited

U.S. PATENT DOCUMENTS

| | | | |
|---|---|---|---|
| 6,961,029 B1 * | 11/2005 | Canova et al. | 345/55 |
| 7,411,583 B1 * | 8/2008 | Wong et al. | 345/175 |
| 2003/0010828 A1 | 1/2003 | Hirata et al. | |
| 2004/0078169 A1 | 4/2004 | Oba et al. | |
| 2004/0219949 A1 * | 11/2004 | Su et al. | 455/558 |
| 2007/0150452 A1 | 6/2007 | Tsurumaki et al. | |

FOREIGN PATENT DOCUMENTS

| | | |
|---|---|---|
| JP | 2001 160105 | 6/2001 |
| JP | 2001-256524 A | 9/2001 |
| JP | 2002 197419 | 7/2002 |
| JP | 2002 230132 | 8/2002 |
| JP | 2003 16395 | 1/2003 |
| JP | 2003 85659 | 3/2003 |
| JP | 2003-346094 A | 12/2003 |
| JP | 2004-133674 A | 4/2004 |
| JP | 2004 272673 | 9/2004 |

OTHER PUBLICATIONS

U.S. Appl. No. 11/912,593, filed Oct. 25, 2007, Maekawa, et al.
U.S. Appl. No. 11/993,125, filed Dec. 19, 2007, Maekawa, et al.
U.S. Appl. No. 11/917,786, filed Dec. 17, 2007, Hattori, et al.
Japanese Office Action issued Oct. 2, 2012 in Patent Application No. 2005-183955.

* cited by examiner

DISPLAY TERMINAL DEVICE

TECHNICAL FIELD

This invention relates to a display terminal device that is able to communicate with a memory of an IC card, for instance.

The present application claims priority rights based on the Japanese Patent Application No. 2005-183955 filed in Japan on Jun. 23, 2005. This application is to be incorporated by reference in the present application.

BACKGROUND ART

In some IC cards, having memories enclosed therein, money data are stored in the memories. In these IC cards, when the user purchases goods in a store, an amount equivalent to the price of the goods is subtracted from the money data. In addition, purchase hysteresis data are recorded in the memory, by way of update processing.

In a railroad station, a square or a lobby, visited by many people, display device apparatus for advertisement and merchandizing are frequently installed. These display apparatus display advertisement data, prepared by e.g. an advertisement agency, as moving pictures or as still images. The advertisement, displayed by the display apparatus, is furnished uni-directionally to the viewer, so that, even if the viewer desires to learn details of certain goods, thus advertised, he or she is unable to learn them instantly.

Meanwhile, as a publication similar to the present invention, there is Japanese Patent Laid-Open 2001-160105.

DISCLOSURE OF THE INVENTION

Problems to be Solved by the Invention

In view of the above-described problems of the related art, it is an object of the present invention to provide a display terminal device in which a reader/writer capable of communicating with a memory of an IC card, for example, is provided on the display side, in which data relevant to contents data demonstrated on the display unit may readily be exchanged with the memory and in which advertisements may be made highly efficiently.

It is another object of the present invention to provide a display terminal device in which an operating unit is provided in the vicinity of the display unit to provide for facilitated display operation for contents data on the display unit.

It is a further object of the present invention to provide a display terminal device in which it is possible to protect an area on a display unit over which is placed the memory.

It is yet another object of the present invention to provide a display terminal device in which a support is provided in the vicinity of the display unit to provide for simplified accurate data exchange operations with the memory.

According to the present invention, there is provided a display terminal device comprising a main body unit, a display unit provided on the main body unit and configured for displaying contents data, a communication unit for communicating with a host device, a reader/writer provided on the main body unit and configured for communicating with the memory from the side of the display unit, and a controller for displaying the contents data received by the communication unit on the display unit. The reader/writer writes and/or reads out data relevant to the contents data. The controller allows the contents data received by the communication unit to be displayed on the display unit and also allows data written in and/or read out from the reader/writer to be transmitted to or received from the host device or another device via the communication unit.

With the display terminal device according to the present invention, in which a reader/writer capable of communicating with the memory from the side of the display unit, where contents data are displayed, is provided on the main body unit, and data relevant to the contents data displayed on the display unit may be exchanged as the contents data are viewed, thereby enhancing ease in handling. For example, if the contents data are advertisement data, the advertiser is able to permit downloading of privilege data, such as coupon data, thereby improving the advertisement effect. On the other hand, a memory owner may readily acquire privilege data relevant to advertisement data, he or she is interested in, by downloading it to the memory.

BEST MODE FOR CARRYING OUT THE INVENTION

The display terminal device, embodying the present invention, will now be described with reference to the drawings.

Figure 1:
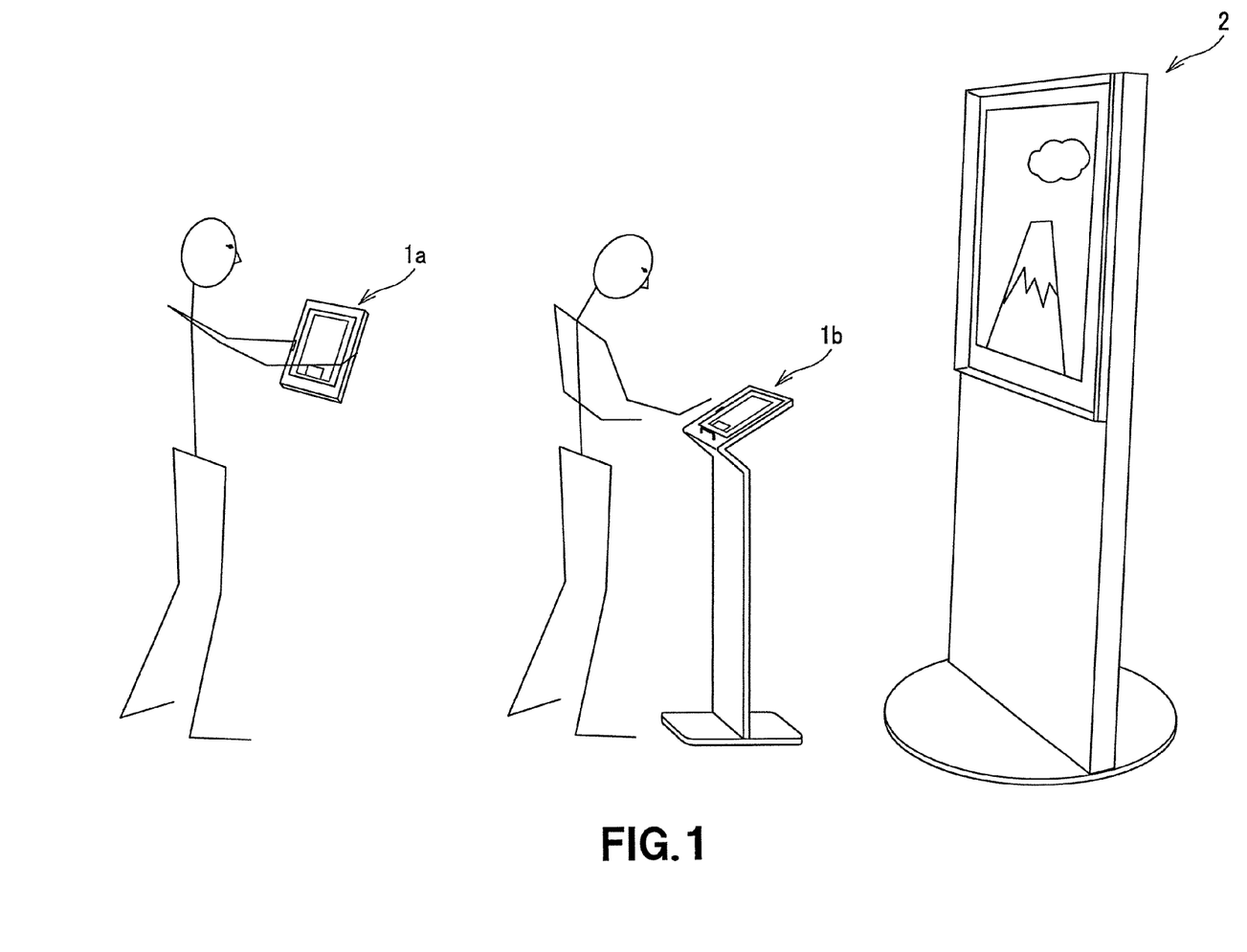
FIG. 1 is a perspective view showing the use state of a display terminal device embodying the present invention.

Referring to FIG. 1, the present invention is applied to both a portable display terminal device 1a of a hand-held size and an installed display terminal device 1b. On these terminal deices 1a, 1b, there may be demonstrated advertisement data made up of moving picture data, still image data, speech data or text data. The portable display terminal device 1a is provided in a guest room of a hotel, for instance, so that it can be freely held by a guest for him or her to view advertisement data. The installed display terminal device 1b is installed in a public space, such as a lobby of a hotel or a railroad station. Meanwhile, the advertisement data which is the same as or relevant to advertisement data demonstrated on a large format installed display device 2, may be demonstrated on the display terminal devices 1a and 1b, as shown in FIG. 1. The portable display terminal device 1a also may be used in a public space.

Figure 2:
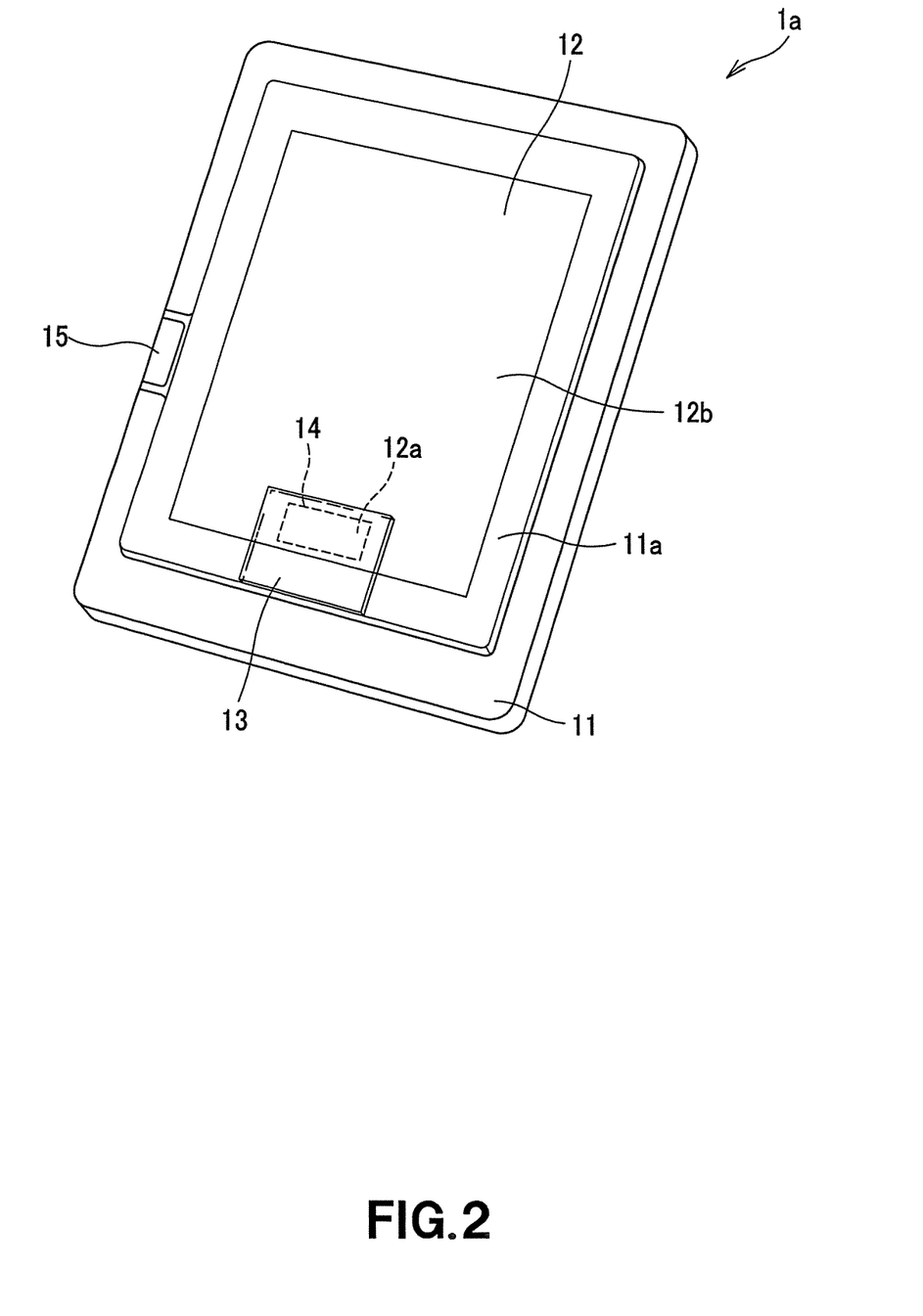
FIG. 2 is a perspective view of a mobile display terminal device embodying the present invention.

Referring to FIG. 2, the portable display terminal device 1a includes a main body unit 11, constituting a substantially rectangular-shaped plate-like enclosure, and a display operating unit 12, provided on a major surface 11a of the main body unit 11 to display advertisement data thereon and which is configured for sensing the thrusting operation on an icon of an operating button displayed. This display operating unit 12 is a touch panel comprised of a liquid crystal panel provided with a sensor to detect the pressure or an electrical signal attributable to static charges. A portion of the display screen is formed as a communication enabling area 12a for exchanging data with an IC card 3, with the remaining portion of the display screen being an inputting enabling area 12b.

This communication enabling area 12a is formed towards one longitudinal side and at a mid part along the width of the display operating unit 12, for instance. A protective plate 13, mounted on the main body unit 11, is arranged in the communication enabling area 12a. The protective plate 13 is formed of a transparent material, such as acrylic resin, to permit an image formed on the communication enabling area 12a to be viewed through from above. The communication enabling area 12a is also a display-only area. The protective plate 13 operates as an index for indicating to a user the position over which the IC card 3 is to be put. The protective plate 13 is, however, not indispensable to the present invention.

In case of providing the protective plate 13, operations on the touch panel cannot be made for the area of the display operating unit 12 underneath the protective plate 13, because the protective plate 13 proves a hindrance. Thus, there may be provided a sensor, having a light emitting part and a light receiving part, at each corner of the protective plate 13, and an operating part for giving on-off decision depending on whether or not the light emitted by the light emitting part may be detected by the light receiving part. To this end, it suffices to provide a light emitting part and a light receiving part at an end and at the opposite side end of a diagonal line drawn on the surface of the protective plate 13. With this sensor 13, it is possible not only to detect whether or not the IC card 3 has been placed over the protective plate 13, but also to generate preset operating signals depending on whether or not a finger, for example, is placed over the sensor area.

Figure 4:
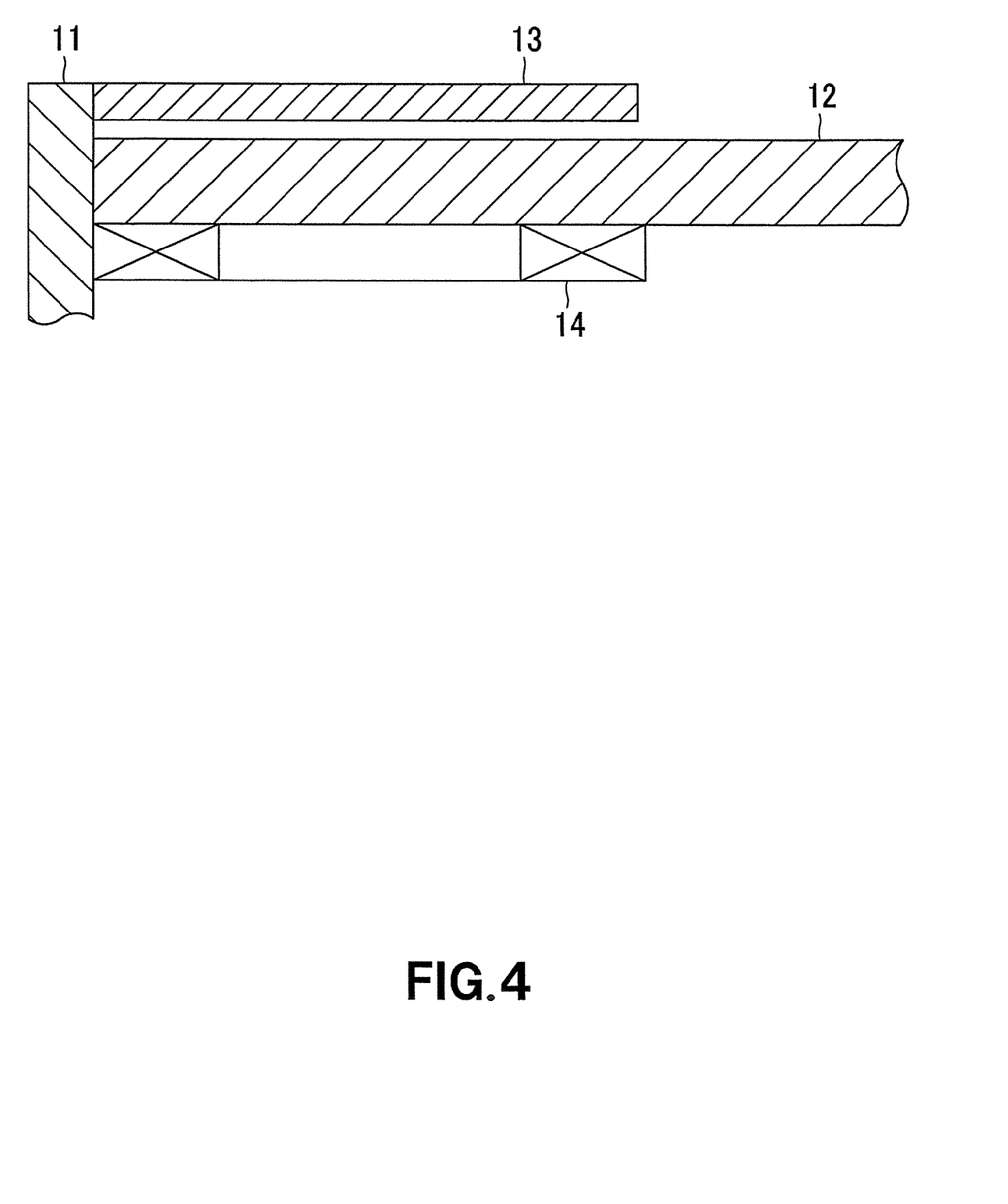
FIG. 4 is a cross-sectional view of a display terminal device that may be mobile and installed.

The cross-sectional structure of the display terminal device 1a is now described with reference to FIG. 4, which is a cross-sectional view of the communication enabling area 12a. Referring to FIG. 4, a loop antenna 14 is provided on the back side of a touch panel constituting a display operating unit 12. The side of the loop antenna facing the touch panel constitutes a part of the reader/writer of the IC card 3, with the touch panel side of the loop antenna being the communication side. This loop antenna 14 communicates with the IC card 3 in accordance with, for example the RFID (Radio Frequency Identification System), and is electrically connected to a reader/writer circuit as later described. The loop antenna 14 is magnetically coupled with a loop antenna provided on the IC card 3 to carry out non-contact data communication with the loop antenna provided on the IC card 3. With this communication system, the separation between the loop antenna of the IC card 3 and the loop antenna 14 of the reader/writer is selected to allow for near-distance non-contact data communication therebetween.

An operating unit 15 is provided at a mid part of one of the long sides of the main body unit 11, as shown in FIG. 2. This operating unit 15 is a rotary switch that may be rotated in a direction along the thickness of the main body unit 11 to permit scrolling of the image demonstrated on the display operating unit 12. This operating unit 15 may also be designed as a rotation pressuring type switch in order to perform a selecting operation in addition to the scrolling operation.

According to the present invention, the display operating unit 12 may also be mounted on the main body unit 11, operating as an enclosure, using a set screw, for example, to permit exchange of the main body unit 11 with another main body unit having a color or shape different from that of the main body unit 11.

Figure 3:
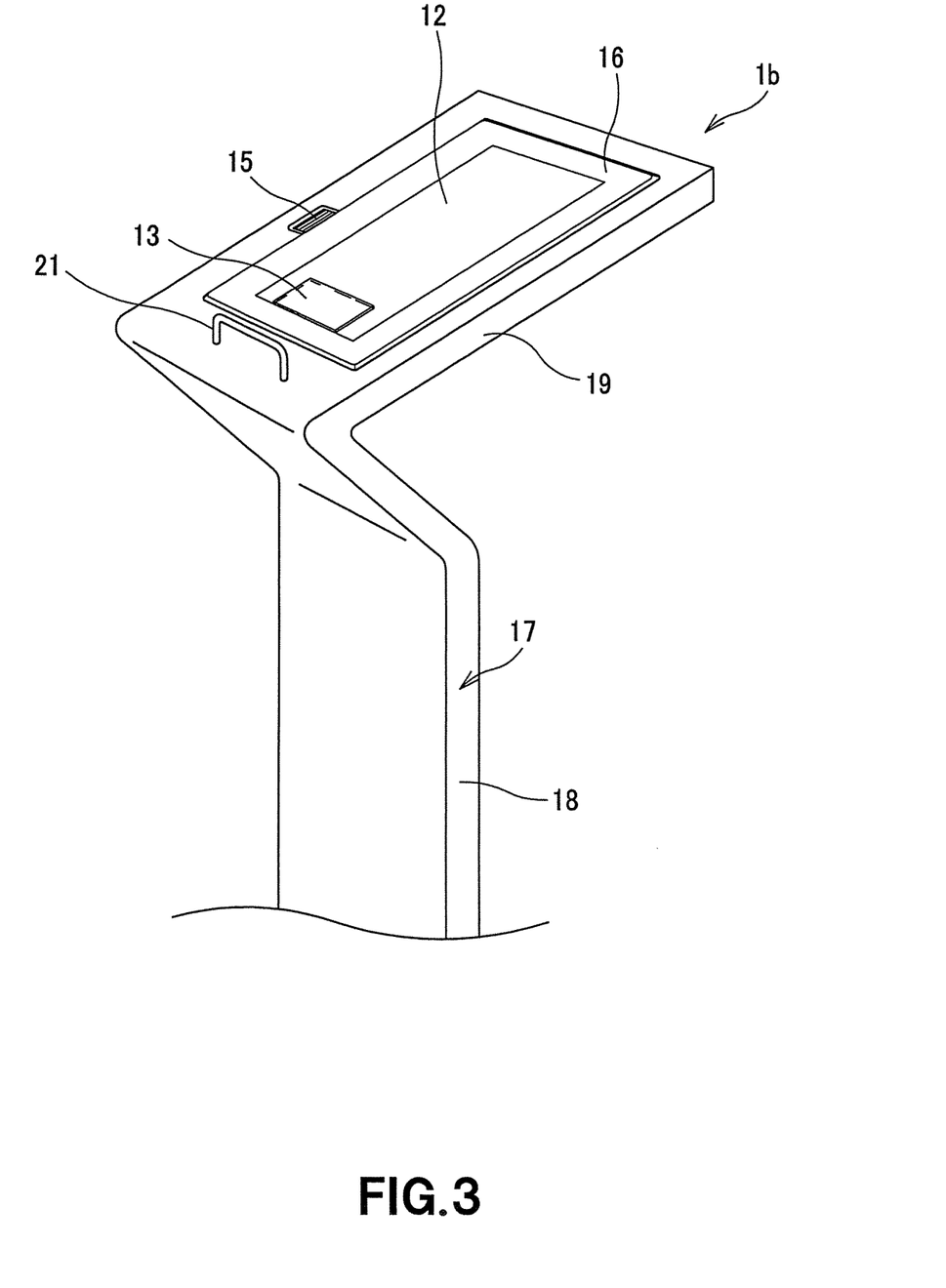
FIG. 3 is a perspective view showing an installed display terminal device embodying the present invention.

The installed display terminal device 1b, shown in FIG. 3, will now be described with reference to FIG. 3. Basically, the installed display terminal device 1b is a display unit 16 constituted by the above-described portable display terminal device 1a and which is mounted on a stand unit 17. The display unit 16 is of the same structure as the portable display terminal device 1a and hence is not described in detail.

The stand unit 17 of the installed display terminal device 1b includes, in an upper portion of a stand part 18, a mounting part 19, the display unit 16 is attached to. The mounting part 19 is designed so that a display surface of the display unit 16 directs obliquely upwards, in order to permit the operation by a user in an erect position. The display unit 16 is secured in position with a set screw, not shown. On the lower side of the display unit 16, more specifically, on the lower side of the communication enabling area 12a, of the mounting part 19, there is provided a support 21 for an IC card 3. This support 21 supports the IC card 3 from its underside when the user has set the IC card on the protective plate 13. That is, the IC card 3 may be carried at all times by this support 21 and hence the user may intensively view advertisement data to concentrate his or her attention on the operation of the operating unit 15.

Figure 5:
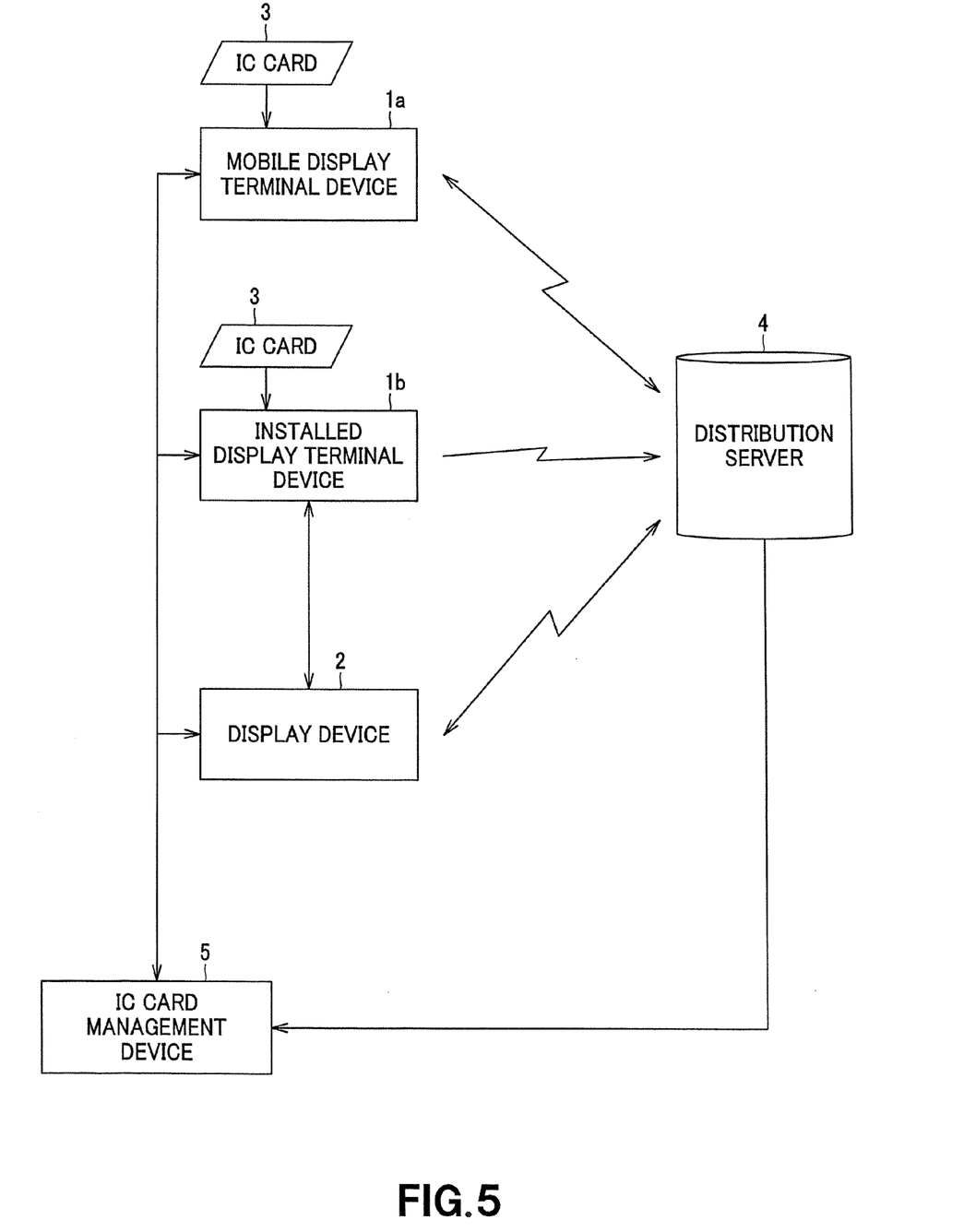
FIG. 5 is a schematic view showing a distribution system in which the display terminal device embodying the present invention is used.

The portable display terminal device 1a and the installed display terminal device 1b, described above, may be used in a distribution system shown in FIG. 5. This distribution system 1 is designed to distribute advertisement data from a distribution server 4, as a source of distribution of the advertisement data, to the portable display terminal device 1a, the installed display terminal device 1b according to the present invention, or to the large format installed display device 2, shown in FIG. 1, over a wired or wireless path. As pertinent communication standards, USB (Universal Serial Bus), Bluetooth, IEEE (the Institute of Electrical and Electronics Engineers) 1394 or IEEE802 may be used, for instance.

The distribution server 4 has a constitution similar to that of the ordinary computer, and includes a hard disc, a ROM (Read Only Memory), a RAM (Random Access Memory), a CPU (Central Processing Unit) and a communication I/F for communication over a network, for instance. The advertisement data, distributed by the distribution server 4, has a hierarchical structure, such that, in case given advertisement data is selected, further detailed lower-layer advertisement data are displayed. The distribution server 4 distributes new advertisement data to the display terminal devices 1a, 1b, when the time is a preset time, so that the contents of the advertisement data reproduced on the display terminal devices 1a, 1b will be changed at an interval of the above preset time. The advertisement data will be described later together with the manner of demonstration on the display terminal devices 1a, 1b.

Moreover, with the distribution system, shown in FIG. 5, a reader/writer for the IC card 3 is provided on the display terminal devices 1a, 1b, and it may occur that goods advertised by the advertisement data are purchased and payment is made with the IC card. For this reason, there is provided an IC card management device 5 that controls the IC card 3. The IC card management device 5 also has a constitution similar to the usual computer and includes a hard disc, a ROM, a RAM, a CPU and a communication I/F for communication over a network, for instance. This IC card management device 5 controls hysteresis data transmitted from the display terminal device 1a, 1b, such as IDs of goods, amount data disbursed for purchasing the goods, or the IDs of stores where goods are purchased, in a database constructed in a hard disc, for instance. These hysteresis data may be transmitted to the IC card management device 5 either directly over a dedicated line from the display terminal devices 1a, 1b or indirectly through the distribution server 4.

The portable display terminal device 1a and the installed display terminal device 1b are sometimes collectively referred to as a display terminal device 1.

Figure 6:
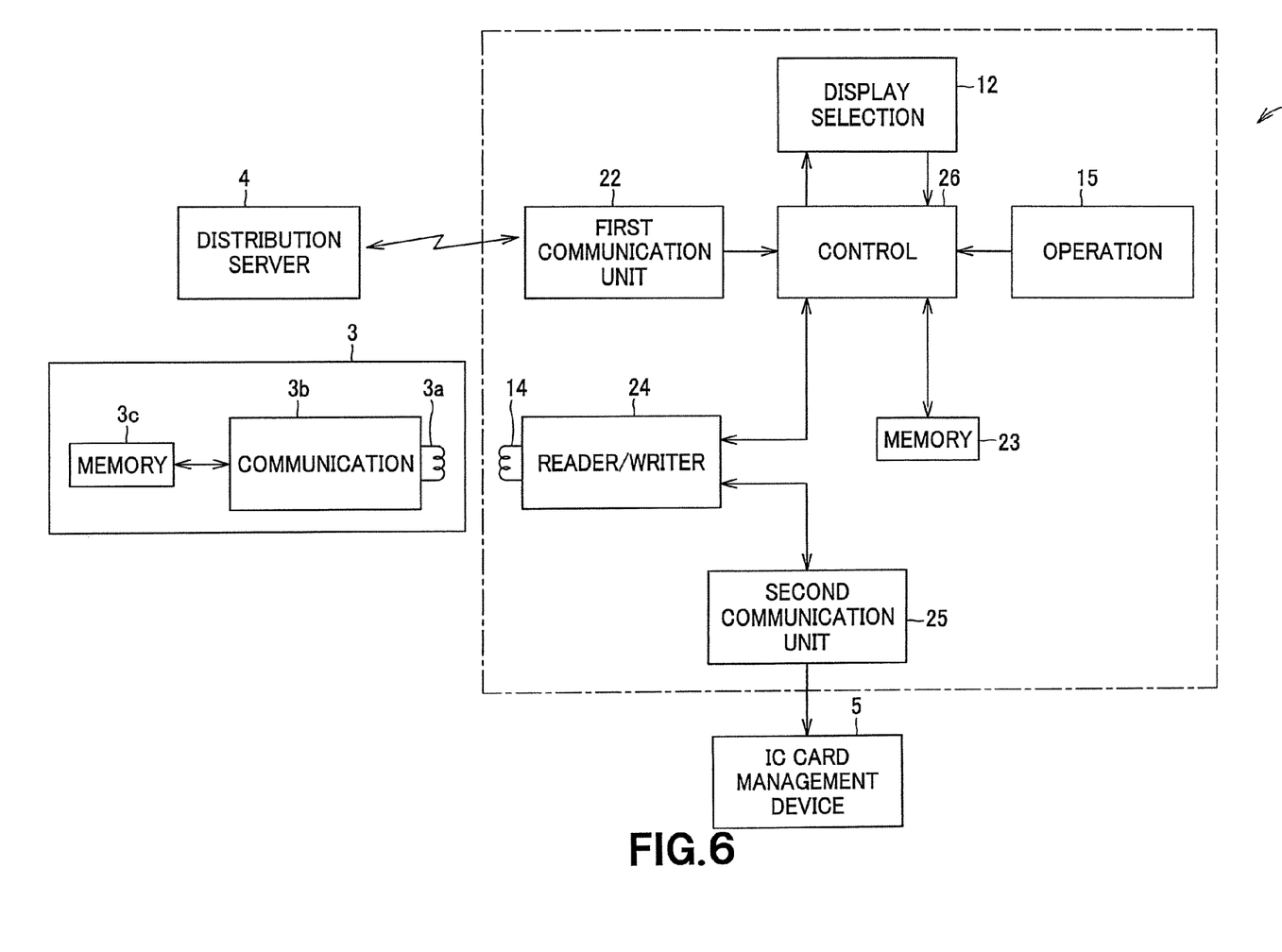
FIG. 6 is a block diagram showing the display terminal device embodying the present invention.

The circuit constitution of the display terminal device 1 will now be described with reference to FIG. 6. The display terminal device 1 includes, in addition to the display operating unit 12 and the operating unit 15, a first communication unit 22 for communication with the distribution server 4 over a network, a memory 23, a reader/writer circuit 24, a second communication unit 25 and a controller 26. The memory 23 stores data relevant to advertisement data demonstrated on the display operating unit 12. The reader/writer circuit 24 communicates with the IC card 3, while the second communication unit 25 communicates with the IC card management device 5. The controller 26 controls the overall operation.

The first communication unit 22 receives advertisement data transmitted from the distribution server 4 and sequentially outputs the received data to the display operating unit 12 to enable streaming reproduction in the display operating unit 12. Those still image data or moving picture data not subjected to frame-based changes or subjected only to constant frame-based changes, out of the moving pictures or still images displayed, are stored in the memory 23 of the first communication unit 22, thereby reducing the volume of advertisement data received from time to time.

For download reproduction of advertisement data, all advertisement data are stored in the memory 23.

The memory 23 is a hard disc or a non-volatile memory. For streaming reproduction of advertisement data, those still image data or moving picture data not subjected to frame-based changes or subjected only to constant frame-based changes, out of the moving pictures or still images displayed, are stored in the memory 23. For download reproduction of advertisement data, all advertisement data are stored in the memory 23.

If the IC card 3 is acted on by the user in a state in which it may communicate with the reader/writer circuit 24, the hysteresis data, such as hysteresis of pages seen by the display operating unit 12, IDs of goods, amount data disbursed for purchasing the goods, or the IDs of stores where goods are purchased, are saved in association with the identification data of the IC card 3. These hysteresis data may also be saved in a memory distinct from the memory 23.

The reader/writer circuit 24 communicates with the IC card 3 in connection with advertisement data and data relevant to the advertisement data. Specifically, the reader/writer circuit 24 includes a communication circuit the aforementioned loop antenna 14 is connected to. When magnetically coupled with the loop antenna of the IC card 3, the reader/writer circuit 24 carries out data communication with the IC card 3. That is, to record data in the IC card 3 via a communication circuit, the reader/writer circuit 24 modulates the data for transmission, and transmits the modulated data to the IC card 3, while demodulating the data read out from the IC card 3 to output the demodulated data to the controller 26, for instance.

The IC card 3, communicating with the reader/writer circuit 24, is now described. This IC card 3 includes a loop antenna 3a, a communication circuit 3b connected to the loop antenna 3a, and a memory 3c in which to store data. When transmitting data stored in the memory 3c to the reader/writer circuit 24, the communication circuit 3b modulates the data for transmission and outputs the data to the loop antenna 3a, while demodulating the data received from the reader/writer circuit 24 to store the demodulated data in the memory 3c.

The memory 3c is a semiconductor memory, which is a non-volatile memory, for instance. There are stored in this memory intrinsic identification data used for identifying the IC card 3. There are also stored in the memory 3c the money data and use hysteresis data of the IC card 3. There also stored in the memory 3c private data, such as names, addresses or telephone numbers of owners, in case the IC card 3 has the function as a membership card of the hotel. In case the user has downloaded data relevant to the advertisement data, such as coupon data for discounts stated in the advertisement data, or data on participants in an event, from the display terminal device 1 where advertisement data are reproduced, these relevant data are also stored in the memory.

When payment is made at the time of purchasing the goods by the IC card 3, the reader/writer circuit 24 of the display terminal device 1 reads out money data from the memory 3c of the IC card 3. The reader/writer circuit 24 subtracts an amount corresponding to the price of the goods purchased from the memory data, and transmits the resulting amount data to the IC card 3, while transmitting to the IC card 3 the ID of the store and the date/time of purchase, as hysteresis data. The IC card 3, which has received the transmitted data, updates the money data and the hysteresis data stored in the memory 3c. The reader/writer circuit 24 transmits these data via second communication unit 25 to the IC card management device 5 as these data are correlated with the identification data of the IC card 3. When the user downloads data relevant to advertisement data, such as coupon data for discounts stated in the advertisement data, reproduced by the display operating unit 12, or data on participants in an event, the reader/writer circuit 24 sends the relevant data to the IC card 3 to allow the data to be stored in the memory 3c of the IC card 3.

The controller 26 controls the various circuits. For example, in streaming reproduction of advertisement data in the display operating unit 12, those still image data or moving picture data not subjected to frame-based changes or subjected only to constant frame-based changes, are combined with the advertisement data received by the first communication unit 22 and displayed on the display operating unit 12. Also, when supplied with an operating signal from the display operating unit 12 or from the operating unit 15, the controller 26 performs page turning or scrolling of the advertisement data demonstrated on the display operating unit 12 to switch the display in accordance with the operating signal. In case the operating unit 15 is rotated at this time, the controller 26 decides on the page turning speed or the scrolling speed, depending on the amount of rotation, to carry out page turning or scrolling. For example, the controller 26 increases the speed with increase in the amount of rotation of the operating unit 15. When an operating signal for downloading the data relevant to the advertisement data, such as coupon data or participant data, included in the advertisement data, from the display operating unit 12 to the IC card 3, is entered from the display operating unit 12 or from the operating unit 15, the relevant data of the advertisement data is transmitted from the reader/writer circuit 24 to the IC card 3 and to, for example, the IC card management device 5. The controller 26 also transmits the hysteresis data, associated with the identification data of the IC card 3, stored in the memory 23, such as hysteresis of pages seen by the display operating unit 12, IDs of goods, amount data disbursed for purchasing the goods or the IDs of stores where goods are purchased, to the IC card management device 5, through the second communication unit 25, either periodically or from time to time. Thus, with these hysteresis data, the IC card management device 5 is able to perform hysteresis management in association with identification data of the IC card 3 to analyze variable subject-matter including the tastes of the owners of the IC cards.

Figure 7A:
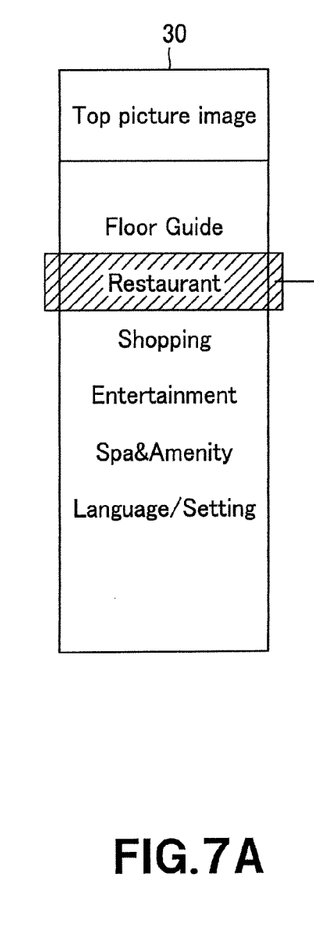
FIGS. 7A to 7D illustrate an operating sequence for the display terminal device embodying the present invention.

The operational sequence of the display terminal device 1 will now be described with reference to FIG. 7. The controller 26 of the display terminal device 1, installed in a guest room or a lobby of a hotel, displays advertisement data, transmitted from the distribution server 4, in the display operating unit 12. These advertisement data are of the layered structure, as described above. As an initial image, a top page 30 is displayed. This top page 30 has first to sixth tabs 31 to 36 for turning the pages on its lateral edge side. Referring to FIGS. 7A and 8, the first tab 31 is for a floor guide, which is a top page 30, and the second tab 32 is for introducing restaurants. The third tab 33 is for shopping and the fourth tab 34 is for entertainments held in the hotel, for instance. The fifth tab 35 is for spas and amenity and the sixth tab 36 is for setting, such as for language setting. The top page 30 displays a hotel's image demonstration 30a. In a communication enabling area 12a of the display operating unit 12, a guide image 30b for informing the viewer of a placing position for the IC card 3, reading: 'Put IC card over this area', for example, is displayed. The area of the display operating unit 12 other than the guide image 30b is the inputting enabling area 12b. By acting on and pressuring any one of the first to sixth tabs 31 to 36, on the top page 30, it is possible to demonstrate the page correlated with the first to sixth tabs.

The first to sixth tabs 31 to 36 are displayed in all pages, and hence may be stored in the memory 23, for instance, to decrease the amount of data received at the time of streaming reproduction.

Figure 7B:
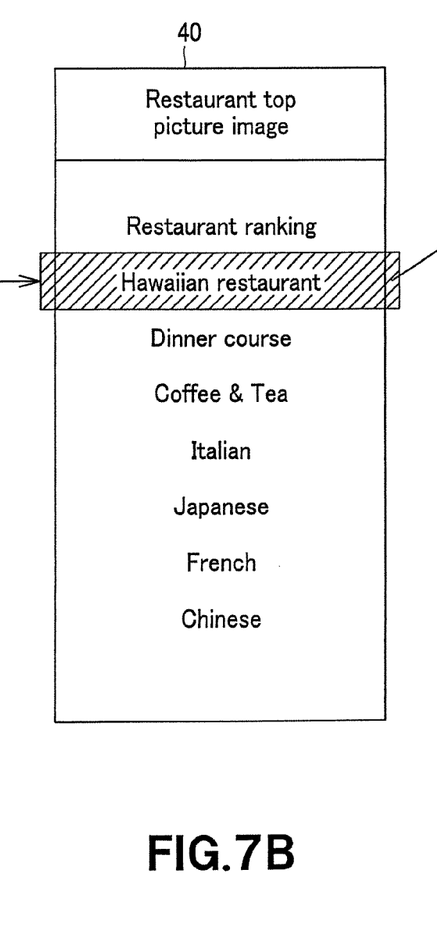
Figure 8:
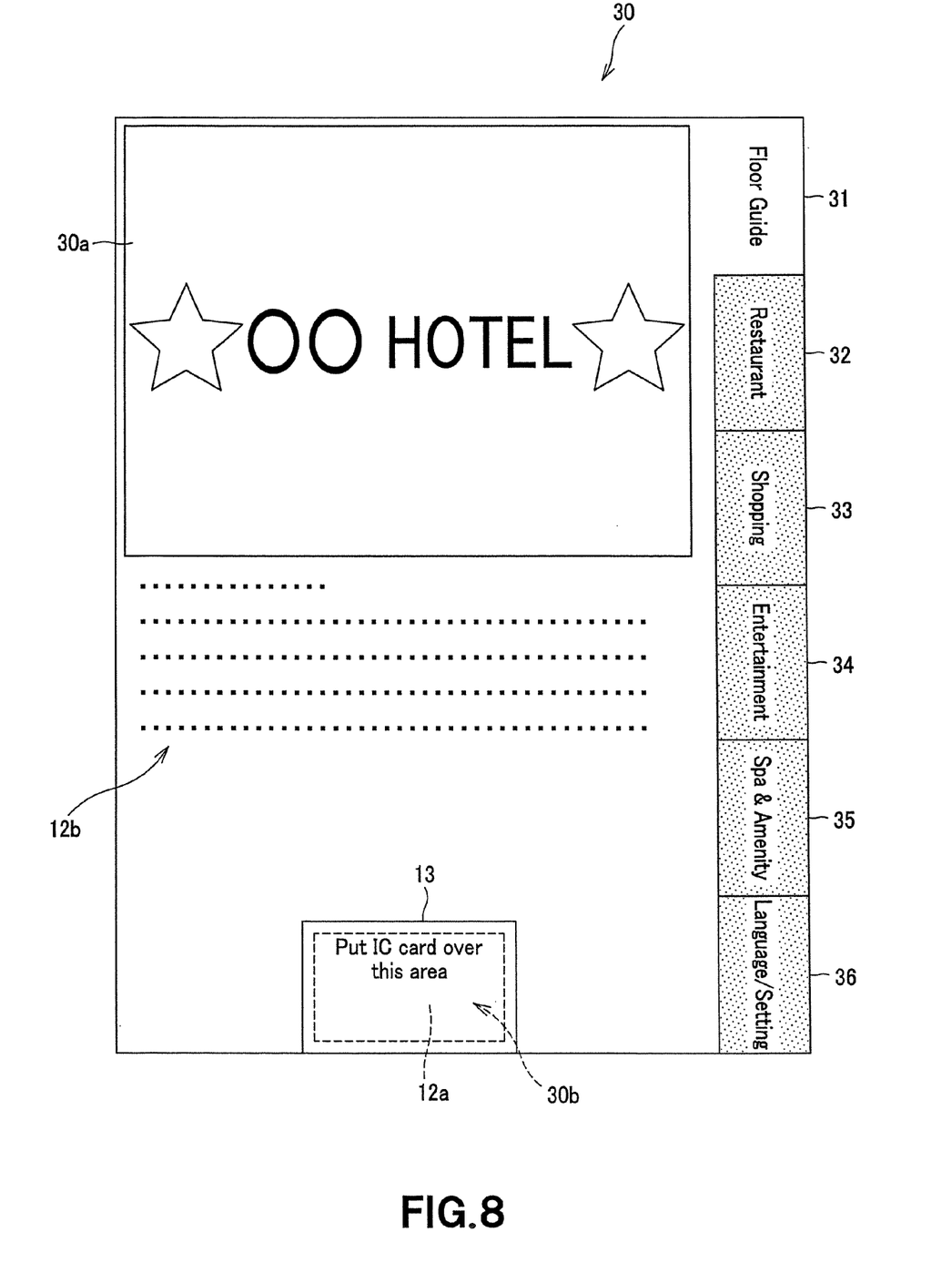
FIG. 8 shows a top page demonstrated on a display operating unit.
Figure 9:
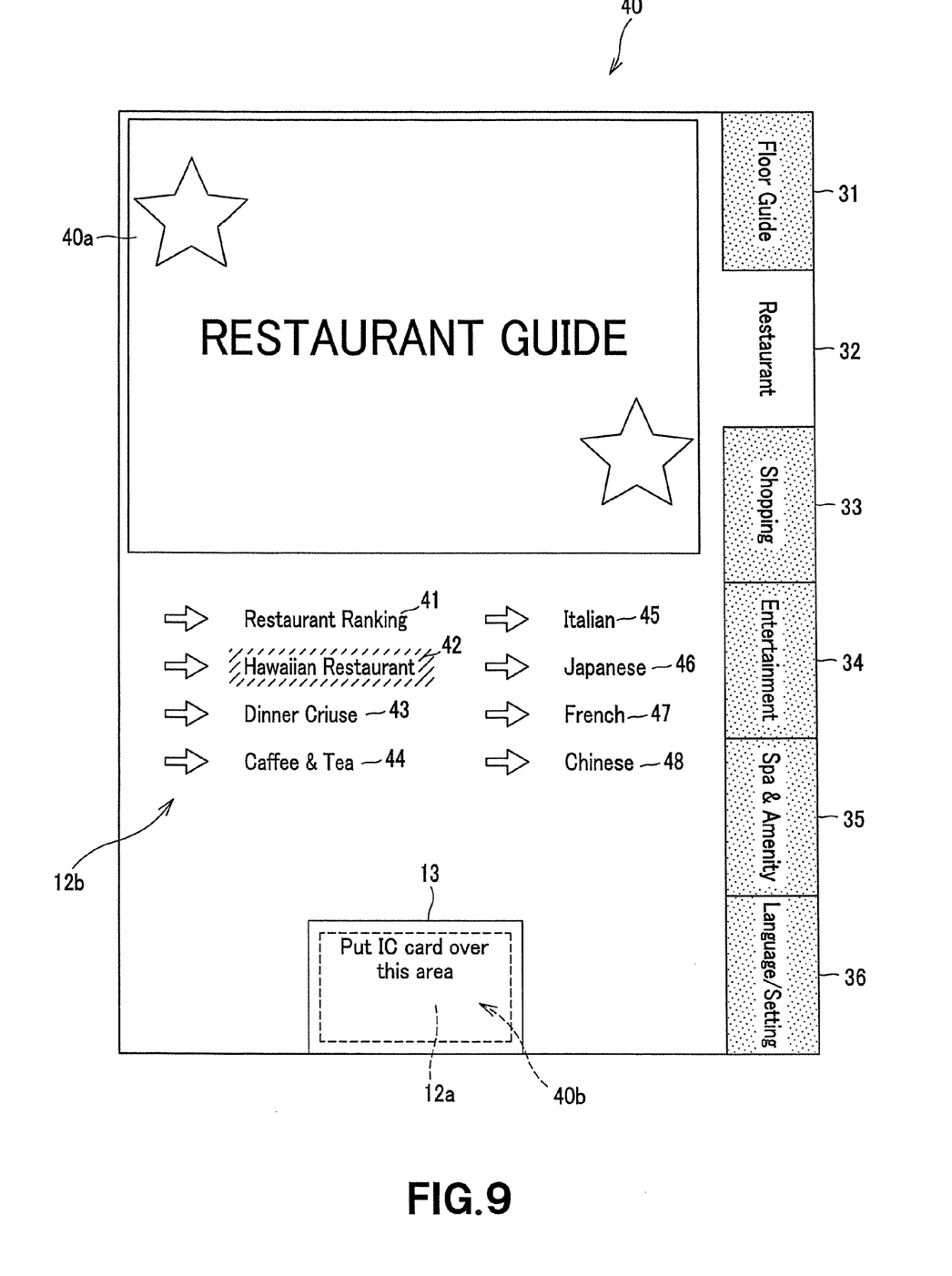
FIG. 9 shows a restaurant top page demonstrated on the display operating unit.

If the second tab 32 in the top page 30 is then pressed on the display operating unit 12, the controller 26 allows the display operating unit 12 to demonstrate a restaurant top page 40, introducing the restaurants, as shown in FIGS. 7B and 9. The first to sixth tabs 31 to 36 are again displayed on this restaurant top page 40. An image demonstration 40a, for instance, is demonstrated on the restaurant top page 40. In the communication enabling area 12a of the display operating unit 12, a guide image 40b for informing the viewer of a placing position for the IC card 3, reading: 'Put IC card over this area', for example is displayed.

In then inputting enabling area 12b in the restaurant top page 40, first to eighth selection parts 41 to 48, as selection enabling areas, are displayed. In an example of FIG. 9, a restaurant ranking page can be opened with the first selection part 41, and a detailed page of Hawaiian restaurants can be opened with the second selection part 42. A detailed page of a dinner cruise can be opened with the third selection part 43, and a detailed page of cafes can be opened with the fourth selection part 44. A detailed page of Italian cooking can be opened with the fifth selection part 45, and a detailed page of Japanese cooking can be opened with the sixth selection part 46. A detailed page of French cooking can be opened with the seventh selection part 47, and a detailed page of Chinese cooking can be opened with the eighth selection part 48.

The parts of the display operating unit 12, where the first to eighth selection parts 41 to 48 are displayed, can be directly pressed for selecting the first to eighth selection parts 41 to 48. In addition, the operating unit 15 may be rotated to permit the controller 26 to select the desired selection parts 41 to 48, and the so selected selection part may then be pressed to open the page correlated with the selected selection part.

Figure 7C:
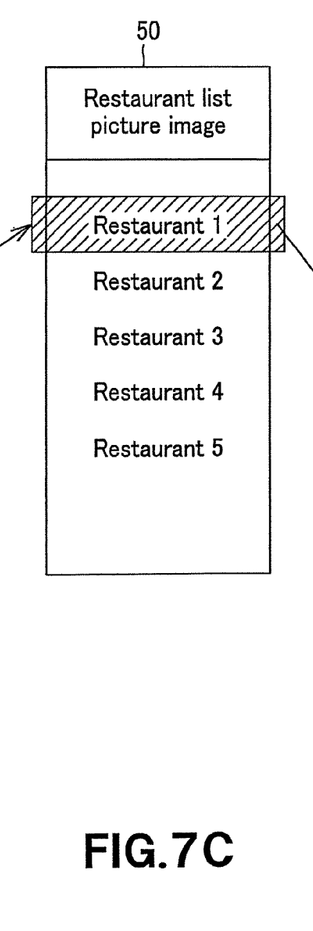
Figure 10:
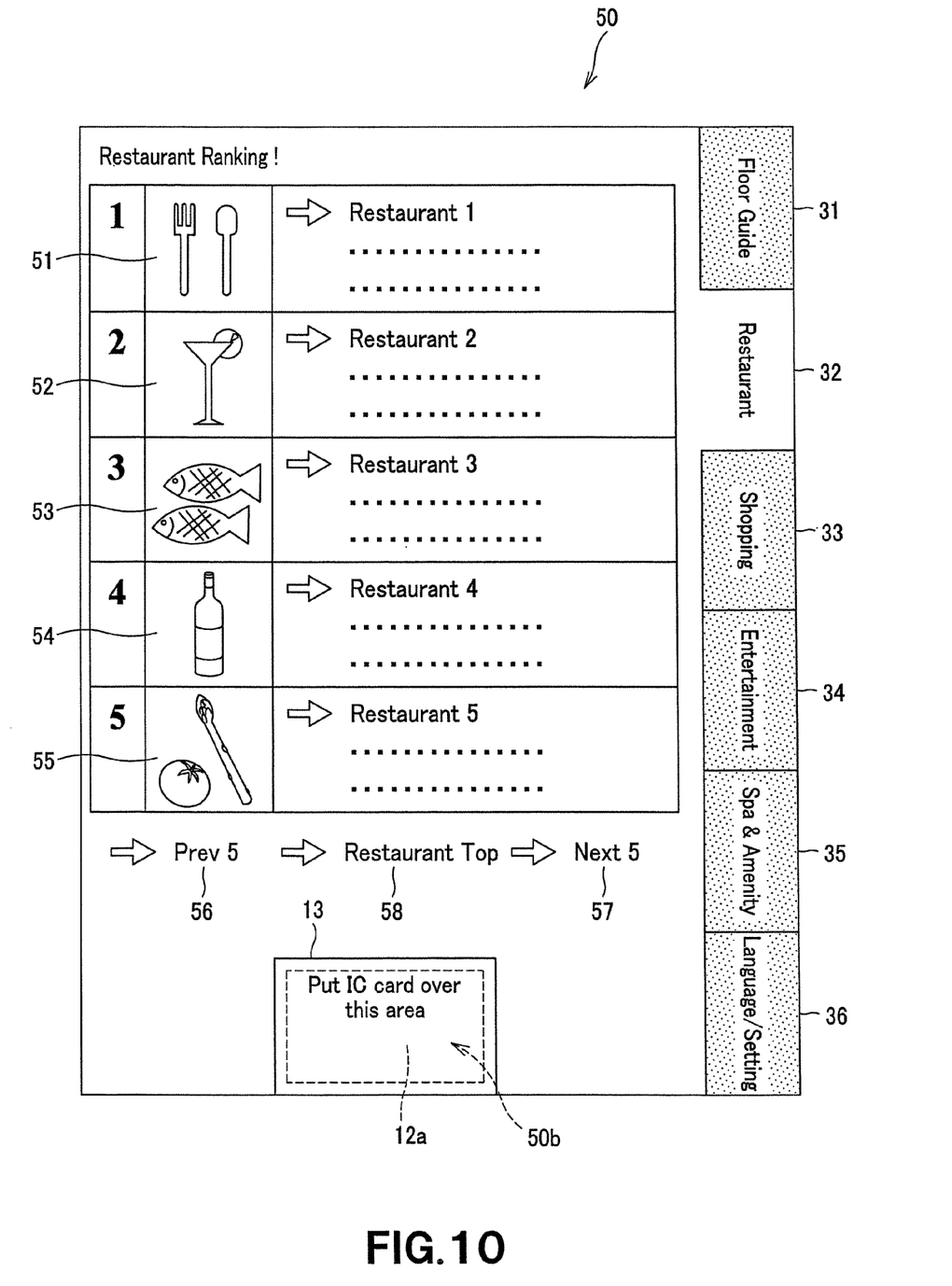
FIG. 10 shows a Hawaiian restaurant page demonstrated on the display operating unit.

If then the second selection part 42 for opening the detailed page of the Hawaiian restaurant in the restaurant top page 40 is selected, using the display operating unit 12 or the operating unit 15, the controller 26 allows a Hawaiian restaurant page 50 to be demonstrated on the display operating unit 12, as shown in FIGS. 7C and 10. The first to sixth tabs 31 to 36 are again displayed on this Hawaiian restaurant page 50. On the Hawaiian restaurant page 50, the Hawaiian restaurants are displayed, a preset plural number of restaurants each time, in the order of the decreasing number of visitors, for instance. In the example shown in FIG. 10, the restaurants 1 to 5 are displayed at a time on the inputting enabling area 12b as first to fifth selection parts 51 to 55. In the communication enabling area 12a of the display operating unit 12, on the Hawaiian restaurant page 50, a guide image 50b for informing the viewer of a placing position for the IC card 3, reading: 'Put IC card over this area', for example, is displayed. An image demonstration 50a for each restaurant is also displayed in each of the first to fifth selection parts 51 to 55. A previous page button 56 and a next page button 57 are provided on the Hawaiian restaurant page 50. When the button 56 or 57 on the display operating unit 12 is pressed, the pages are turned, under control by the controller 26, to permit the five restaurants on the previous and next pages to be displayed. There is also provided a button 58 for returning to the restaurant top page 40 shown in FIG. 9.

In the example of FIG. 10, the detailed page for the restaurant 1 may be opened with the first selection unit 51, and the detailed page for the restaurant 2 may be opened with the second selection page 52. The detailed page for the restaurant 3 may be opened with the third selection page 53, and the detailed page for the restaurant 4 may be opened with the fourth selection page 54. The detailed page for the restaurant 5 may be opened with the fifth selection page 55. The parts of the display operating unit 12, where the first to fifth selection parts 51 to 55 are displayed, can be directly pressed for selecting the first to fifth selection parts 51 to 55. In addition, the operating unit 15 may be rotated to permit the controller 26 to select the desired selection parts 51 to 55, and the so selected selection part may then be pressed to open the page correlated with the selected selection part.

Figure 7D:
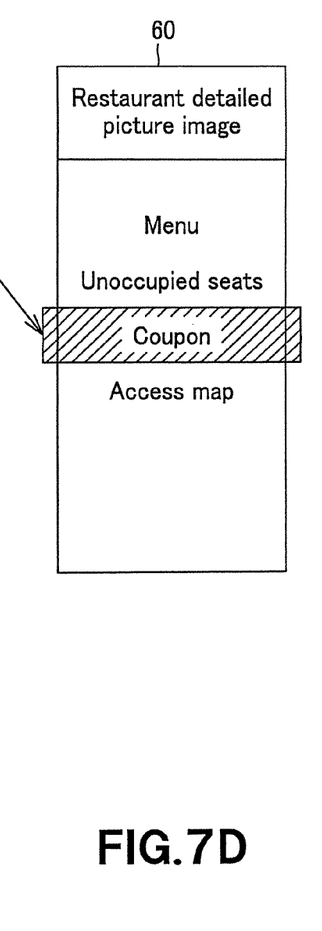
Figure 11:
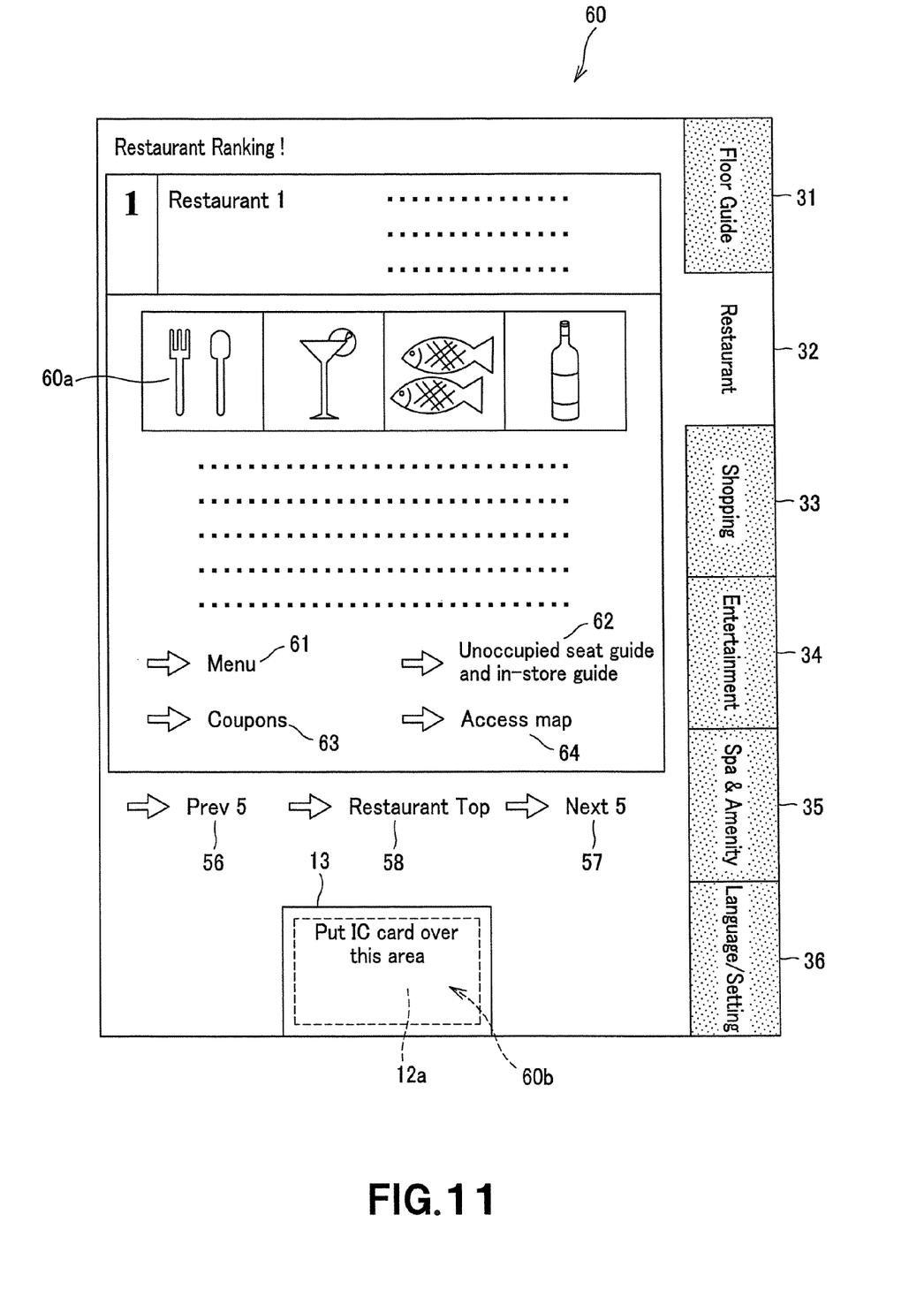
FIG. 11 shows a detailed page of a restaurant 1 demonstrated on the display operating unit.

If the first selection part 51 for opening the detailed page of the restaurant 1 on the Hawaiian restaurant page 50, for example, is selected, using the display operating unit 12 or the operating unit 15, the controller 26 allows a detailed page 60 of the restaurant 1 to be displayed on the display operating unit 12, as shown in FIGS. 7D and 11. The first to sixth tabs 31 to 36 are again displayed on this detailed page 60 of the restaurant 1. An image demonstration 60a for this page, for instance, is demonstrated on the detailed page 60 of the restaurant 1. In the communication enabling area 12a of the display operating unit 12, a guide image 60b for informing the viewer of a placing position for the IC card 3, reading: 'Put IC card over this area', for example is displayed. The detailed page 60 of the restaurant 1 demonstrates the illustration for the restaurant 1.

First to fourth selection parts 61 to 64 are provided on the detailed page 60 of the restaurant 1. In an example of FIG. 11, the page of menu of the restaurant 1 may be opened by the first selection part 61, and the page of unoccupied seat guide and the in-store guide of the restaurant 1 may be opened by the second selection part 62. The coupon data of the restaurant 1 may be downloaded by the third selection part 63, and the page of a map for the restaurant 1 may be opened by the fourth selection part 64.

The parts of the display operating unit 12, where the first to fourth selection parts 61 to 64 are displayed, can be directly pressed for selecting the first to fourth selection parts 61 to 64. In addition, the operating unit 15 may be rotated to permit the controller 26 to select the desired selection parts 61 to 64, and the so selected selection part may then be pressed to open the page correlated with the selected selection part. Meanwhile, if the third selection part 63 for downloading the coupon data is selected, the coupon data are downloaded to the IC card 3. The coupon data may further be printed by a printer, not shown, by pop-up display of a print button.

As long as the picture images shown in FIGS. 8 to 11 are demonstrated on the display operating unit 12, guide images 30b, 40b, 50b and 60b, each with a message reading: 'Put IC card over this area', are displayed in the communication enabling area 12a of the display operating unit 12. In case the IC card 3 is placed at all times over the communication enabling area 12a, in accordance with the guide images 30b, 40b, 50b and 60b, the reader/writer circuit 24 communicates at all times with the IC card 3 to read out identification data of the IC card 3, for instance. The controller 26 causes the page address of the advertisement data, accessed by the user, to be stored in the memory 23, as hysteresis data, in association with the identification data of the IC card 3 read out by the reader/writer circuit 24. The controller 26 may also transmit the page address to the IC card management device 5. This enables analysis of variable subject-matter, such as tastes of the owner of the IC card 3. In one or more of picture images, shown in FIGS. 8 to 11, there may also be provided a selection part for downloading data of participants in the event held by the hotel or the restaurants to the IC card 3.

In the above example, the guide images 30b, 40b, 50b and 60b are demonstrated in all of picture images shown in FIGS. 8 to 11 for communicating with the IC card 3 placed over the communication enabling area 12a. Alternatively, the guide image 60b may be displayed on only the picture image of FIG. 11, on which coupon data may be downloaded, even though the hysteresis data displayed may not be acquired.

In the above example, the memory placed over the communication enabling area 12a of the display operating unit 12 is the IC card 3. However, according to the present invention, the memory may also be a portable device like a portable information processing terminal device, for instance, having enclosed a variety of components implementing the functions of the IC card 3, such as mobile phone or electronic memo, in place of the IC card 3, if the memory so used may be carried about by the user.

The invention claimed is:

1. A display terminal device comprising:
   a main body;
   a touch panel circuit provided on said main body and configured to display contents data and to receive input via touch;
   a wireless reader/writer circuit provided on said main body and configured to communicate with an external memory from a side of said touch panel circuit, the reader/writer circuit wirelessly writing and/or wirelessly reading data relevant to said contents data to/from the external memory, the external memory remaining external to the display terminal device during communication;
   a communication circuit configured to communicate with a host device;
   a controller circuit configured to control said touch panel circuit to display the contents data received by said communication circuit, said communication circuit transmitting data read from said wireless reader/writer circuit to said host device or another device, said communication circuit receiving data to be written by said wireless reader/writer transmitted from said host device or another device; and
   a transparent protective plate provided only over a communication enabling area on said touch circuit and configured to allow wireless writing and/or wireless reading by said wireless reader/writer circuit, the communication enabling area being less than a total area of the touch panel circuit, the transparent protective plate inhibiting input via touch in the communication enabling area of the touch panel circuit,
   wherein said controller circuit is further configured to control said touch panel circuit to display, within said communication enabling area on said touch panel circuit, an instruction for communication with the external memory, said touch panel circuit is a liquid crystal panel having an antenna of said wireless reader/writer circuit arranged on a back side thereof to wirelessly communicate with the external memory.

2. The display terminal device according to claim 1, further comprising:
   an operating circuit is provided in said main body adjacent to said touch panel circuit, said operating circuit being a switch configured to be pressed in a direction along a thickness of said main body.

3. The display terminal device according to claim 1, wherein said touch panel having an inputting enabling area to receive input and a display area which is a display-only area.

4. The display terminal device according to claim 1, wherein said main body is provided in the vicinity of a write and/or readout area by said reader/writer with a support configured to support said external memory when said external memory is placed over said write and/or readout area.

* * * * *